Aug. 11, 1970 MASATO CHIBA ET AL 3,524,025

ROUTE ADVANCE CONTROL SYSTEM FOR AUTOMATIC TELEPHONE EXCHANGES

Filed March 31, 1967 3 Sheets-Sheet 1

ROUTE ADVANCE CONTROL SYSTEM FOR AUTOMATIC TELEPHONE EXCHANGES

Filed March 31, 1967

3 Sheets-Sheet 2

Aug. 11, 1970 MASATO CHIBA ET AL 3,524,025

ROUTE ADVANCE CONTROL SYSTEM FOR AUTOMATIC TELEPHONE EXCHANGES

Filed March 31, 1967 3 Sheets-Sheet 3

United States Patent Office
3,524,025
Patented Aug. 11, 1970

3,524,025

ROUTE ADVANCE CONTROL SYSTEM FOR AUTOMATIC TELEPHONE EXCHANGES

Masato Chiba, Tokyo, Yukio Ozawa, Hiratsuka-shi, Tomonori Nagura, Yokohama-shi, Yusuke Hirano, Fujisawa-shi, Mikio Twasaki, Tokyo, Tomomi Uchida, Yokohoma-shi, Takeshi Kondo, Kawasaki-shi, Shozo Nishimura, Yokohama-shi, and Tomoo Okada, Tokyo, Japan, assignors to Nippon Telegram and Telephone Public Corporation, Tokyo, Oki Electric Industry Co., Ltd., Tokyo, Nippon Electric Company, Limited, Tokyo, Fujitsu Limited, Kawasaki-shi, and Hitachi, Ltd., Tokyo, Japan, all corporation of Japan Filed Mar. 31, 1967, Ser. No. 627,514
Claims priority, application Japan, Apr. 14, 1966, 41/23,746
Int. Cl. H04q *3/56*
U.S. Cl. 179—18 7 Claims

ABSTRACT OF THE DISCLOSURE

In an automatic telephone exchange of the common control type, a route advance system which is limitless in the number of advances and requires no addition of equipment for an increased number of advances, is provided by including the main part of the route advance function in equipment other than the marker, for example in the translator so that the busy/idle conditions of all trunks for each route are continuously supervised, thereby the route advance during the all-trunk-busy condition is carried out before the extraction of a route number, and if a trunk is found due to mismatch with the channel after the selection of a trunk, said trunk being temporarily blocked so as to bring the trunk to an all-busy condition and thus to effect the route advance.

This invention relates to an automatic telephone switching system and more particularly to a route advance control system for an automatic telephone exchange provided with the common control system.

As publicly known, alternate routing systems have been widely utilized so far in modern automatic telephone networks in order to provide economy of construction of the networks and to provide means for preventing in the telephone system troubles caused by failures on the cable. It is required in automatic telephone switching equipment used in such a telephone system, therefore, to provide a function to advance the call to an alternate route when the wanted route is not available due to an all-trunk busy or all-channel busy condition.

A typical example of such a conventional type of route advance system is described in the U.S. Pat. No. 2,585,-904, filed on Oct. 29, 1948. In this already-patented system, however, the busy-idle conditions of trunks on the wanted route are supervised in every trunk link frame by the common control device, that is, by the markers, and if all the trunks are busy or there are some idle trunks but none of them are available owing to an all-channel busy condition, route advance relays of the marker operate to advance the call to an alternate route. With such a system, an advantageous feature is provided in that all the connecting operations required of the route advance operation can be accomplished within the marker. There are, however, several disadvantages to such a system, for example, the increase in the number of routes and the frequency of advances will result in an increase of initial investment for the marker, thus placing the economy of the overall system at a disadvantage. In order to minimize the possible disadvantages resulting from the increases in the number of routes and frequency of the advances, the route advance function should be incorporated within another device, the required number of which in the system is less than that of the marker. In general, for the aforementioned reason, it is preferred to give the route advance function to a translator which originally functions to translate a dialled number into a route number.

A major object of the invention is to provide an economical route advance system in which the frequency of advance will not be limited and there will be no increase in installation according to the number of times of advance.

Another object of this invention is to provide a most economical route advance system when the major part of the route advance function is incorporated with a device other than the marker, such as a translator.

In the route advance systems employed in the past, the extraction of a route is carried out regardless the busy-idle condition of the relevant trunks and the busy-idle condition of the trunks is checked based on the above information, then the route is advanced if no idle trunk is available.

A major advantageous feature of the invention is that the aforementioned purpose can be achieved by performing all-the-time supervising of an all-trunk busy condition in every route then carrying out the route advance operation against the all-trunk busy condition prior to extraction of the route number.

Another advantageous feature of the present invention is that if the route advance is carried out after selection of a trunk because of an all-channel busy condition, all the trunks of the relevant route are made all-busy for providing the route advance by means of temporarily forcing to make busy the trunk, which is unavailable because of the all-channel busy condition.

This invention provides an economical and highly flexible route advance system without limitation of frequency of route advances by providing means for all-the-time supervising of the all-trunk busy condition of each of the routes, means for avoiding the route corresponding to an all-trunk busy condition detected by the above means and advancing the call to another alternate route, and means for making busy a selected trunk through a means for selection if all the channels are busy, then extracting again the route number.

Other objects and features of the present invention will be apparent from the following detailed description of a preferred embodiment when taken in connection with the accompanying drawings, in which.

An outline of the route advance system according to the present invention will now be described with reference to FIGS. 1 and 2.

Figure 1:
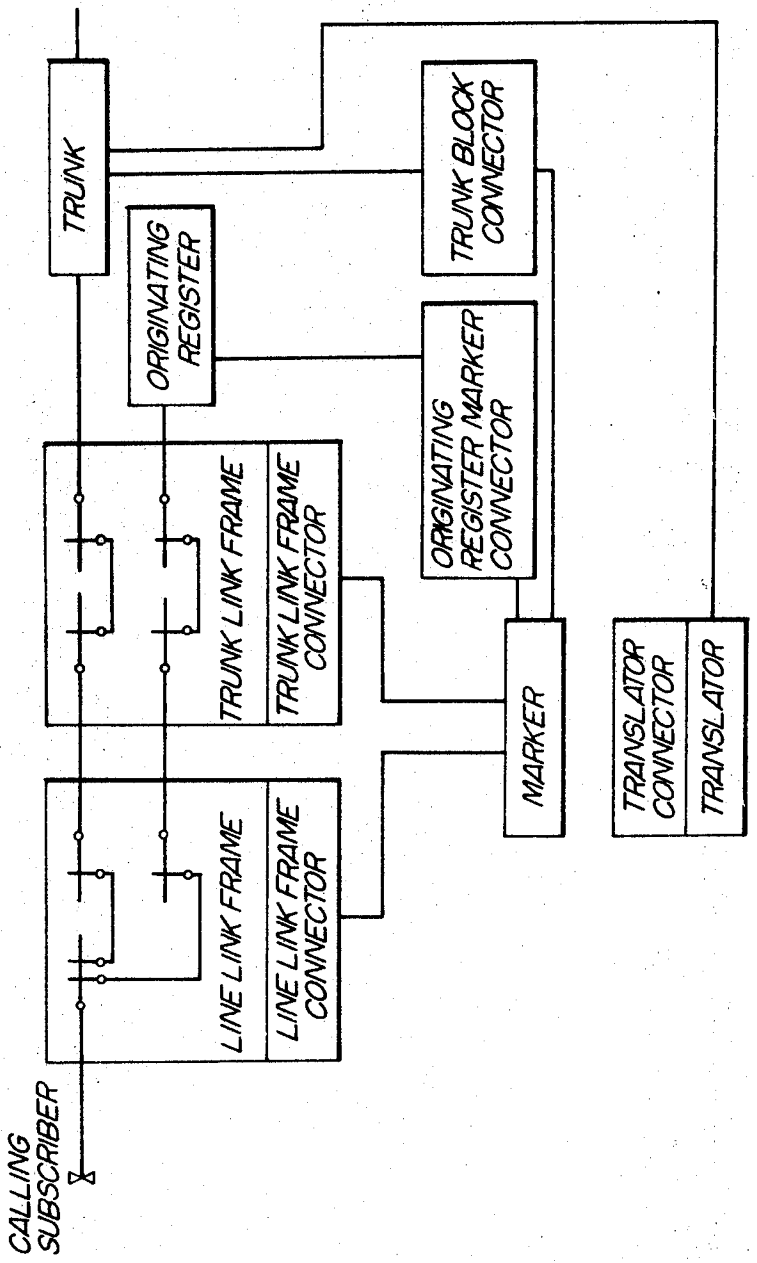
FIG. 1 shows a block diagram of the outgoing connection of a telephone switching equipment of the crossbar type.

FIG. 1 is a block diagram of the outgoing connection of switching equipment of the known crossbar type, in which the dial tone connection from a calling subscriber up to an originating register is shown in the completed form. The calling subscriber dials the called subscriber's number upon hearing a dial tone in his receiver. The dialled number is received and counted by the originating register and stored therein. Upon completion of the dialling, the originating register activates the originating register marker connector to seize an idle marker and transfers the called subscriber's number stored to said marker. Upon receipt of this number, the marker immediately activates the translator connector then transfers the called subscriber's number to the translator. The translator extracts a route number corresponding to the route to be connected in accordance with the given called subscriber's number. It then translates the route number into the control information required of the marker to control the trunk and others and transfers said information to the marker. After confirming the information, the marker functions to release the translator. The marker, based on the control information given by the translator, selects one of the idle trunks on the wanted route and an idle connecting path, that is, an idle channel between said trunk and the calling subscriber, then, after releasing the already-set connecting path between the calling subscriber and the originating register, drives the crossbar switches of the selected connecting path, thus completing the entire connecting path required. If there is no idle channel available, the marker will carry out recycling, that is, repeats the aforementioned operations by re-selecting another trunk on the same route until the idle channel is obtained.

The above-mentioned operational procedures are applicable for a very conventional type of crossbar switching equipment, for example, the switching equipment according to the prescribed U.S. Pat. No. 2,585,904. It will be, therefore, necessary to provide further detailed description in connection with FIG. 2 in order to clarify the features of the present invention.

Figure 2:
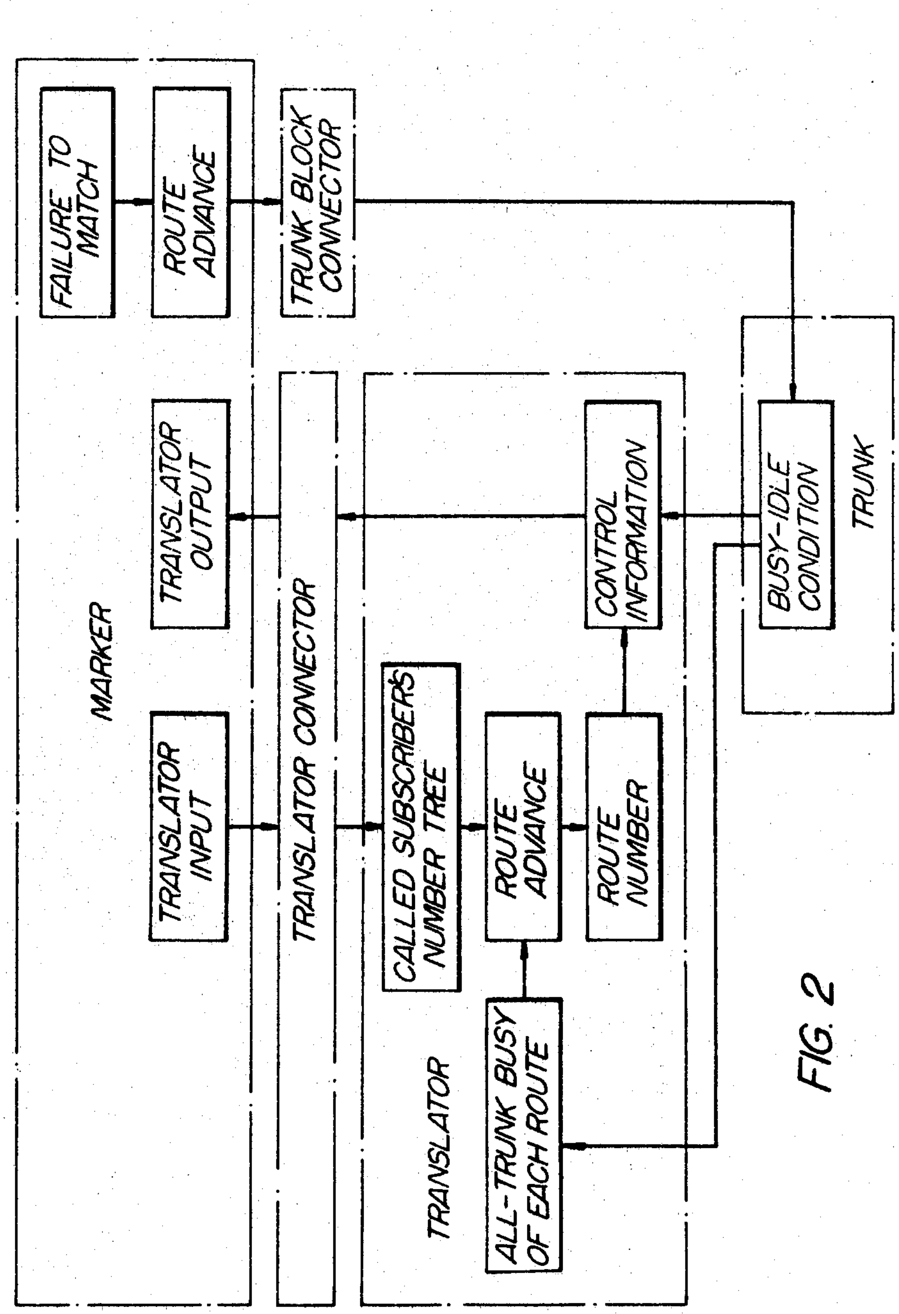
FIG. 2 shows in diagrammatic form the function of a portion of said switching equipment related to the route advance operation.

As shown in FIG. 2, the major components of the translator are a called subscriber's number receiving and selecting tree circuit, all-trunk busy condition supervising circuits for each route, route advance circuit and route number and marker control information extracting circuit.

When the marker seizes the translator and transfers the called subscriber's number thereto, the selecting tree circuit in the translator is completed and a route number corresponding to said called subscriber's number is extracted. It should be noted, however, that the extracted route number may be either of the original route or alternate route after route advancing. Namely, the all-trunk busy condition supervising circuit of each route to check always watches the trunks of each route if all the trunks are busy on each route. If all the trunks are busy, the route is made busy and transferred to an alternate route by the route advance circuit, therefore, the route number obtained is determined depending on condition of the route advance circuit at the time when the translator is seized. In this way, the route advance operation under the all-trunk busy condition is automatically carried out prior to the extraction of the route number according to this novel invention, therefore, no delay in time will be caused. The above-mentioned descriptions are applicable for the route advance operation under the all-trunk busy condition. On the other hand, the route advance operation can be carried out as follows when there is an idle trunk but no idle channel available.

As previously described, the marker upon receipt of and in accordance with the control information from the translator functions to select an idle trunk and an idle channel between said trunk and the calling subscriber. If there is no idle channel, it carries out the recycling operation by which another idle trunk on the same route may be selected and the procedures are repeated until the idle channel is obtained. It is preferred, when re-selecting another trunk, to arrange the selection so that a channel consisting of links not used in the previous operation to gain an idle channel should be selected. For example, in the exemplary case, a trunk of a different trunk block should be selected because the trunk blocks and trunk link frames correspond to each other on a one-to-one basis.

In general, the congestion condition of a switch frame of a crossbar type switching system may require several cycles of the re-cycling operation. If no idle channel can be obtained after carrying out the re-cycling operations for several times, there is no alternative choice but to give up the call as a loss.

In such a case, the route advance operation is not performed and a busy tone is delivered to the calling subscriber and the marker is released. In a high usage route where the switching system is formed on the assumption that the call is route advanced to an alternate route, however, the traffic condition will not be satisfied unless the route advance operation is performed even in such a case. The marker will then carry out the route advance operation when it fails to obtain an idle channel if the number of trunk blocks containing an idle trunk is less than the number specified.

Upon detection of the above-mentioned condition, the marker activates its route advance circuit to the trunk which failed in obtaining an idle channel and then again seizes the translator. If there is no idle trunk other than that trunk which failed in obtaining an idle channel, all the trunks of the route are made busy owing to the forced make-busy operation, and the route advance circuit of said translator then functions to arrange an automatic route advance operation, thus causing extraction of a control information for the alternate route. If there is any idle trunk other than said trunk which failed in obtaining an idle channel, a control information for the same route is again given. In this case, the priority in order of trunk selection in the marker is changed to make it possible to select the trunk which has not yet been applied for the searching of the idle channel.

Figure 3:
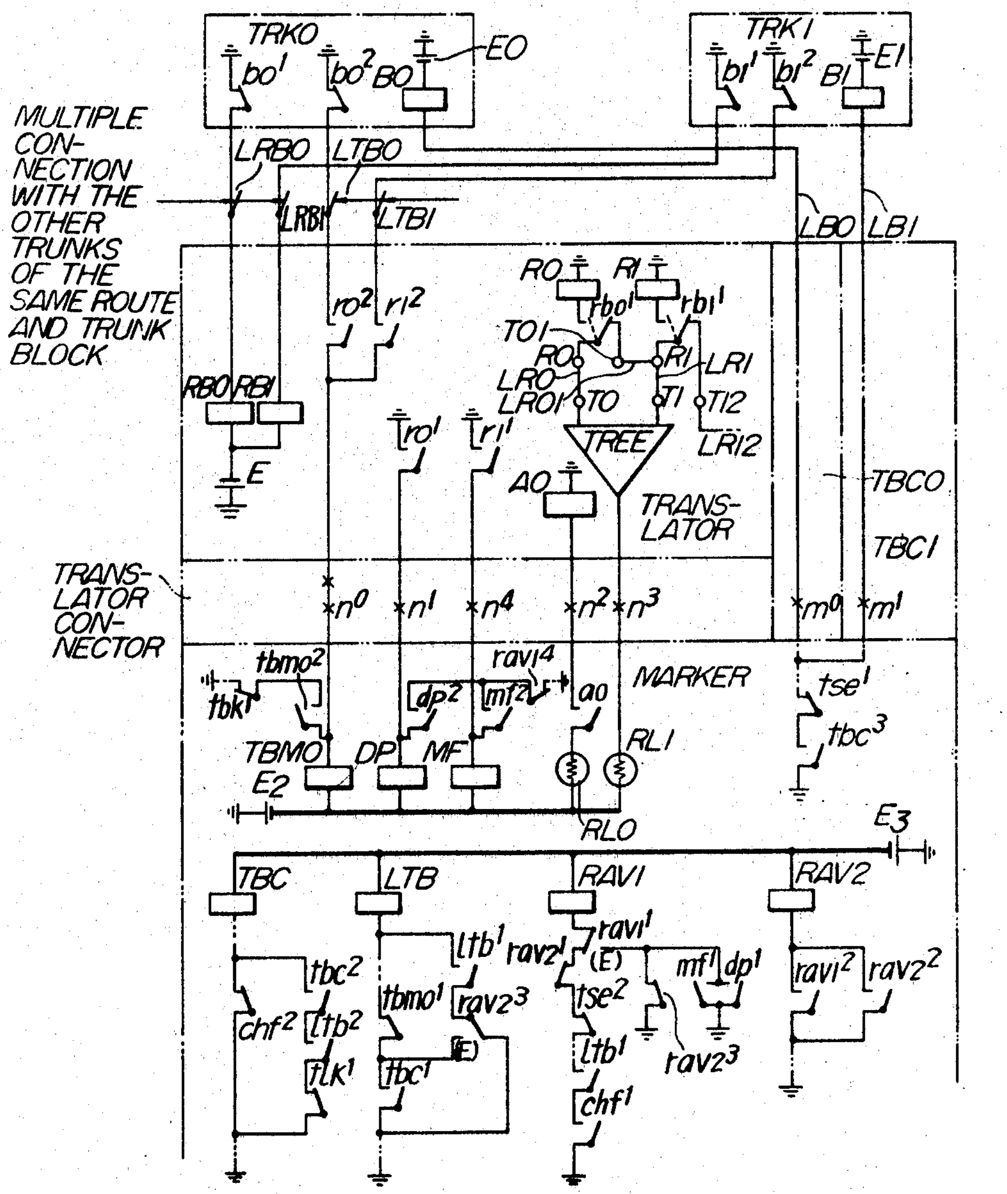
FIG. 3 shows in diagrammatic form an example of the control circuit corresponding to FIG. 2.

The present invention will now be described further in detail with reference to the FIG. 3 showing in diagrammatic form the principle of the circuit operation.

Corresponding to the route numbers 0 and 1, route relays R0, R1 and route busy supervising relays RB0, RB1 are provided in the translator. These relays are provided corresponding to the route numbers, however, only two routes 0 and 1 are shown herewith for simplicity of description.

The route busy supervising relay RB0 is always connected to the busy-condition indicating circuit in all the trunks of the route 0 through a normally closed circuit consisting of the battery E—winding of the relay RB0—conductor LRB. The trunk busy-condition indicating relay B0 operates while the relevant trunk is used, therefore, the relay RB0 is activated by the ground potential given thereto through a normally closed break contact $b0^1$ of the idle trunk. If all the trunks are busy, the relay B0 operates in every trunk and the ground potential on the conductor LRB0 is removed due to opening of the break contact $b0^1$ in every trunk, thus releasing the relay RB0. Similarly, the relay RB1 is connected to the busy-condition indicating circuit of all trunks of the route 1 and operates depending on whether the trunks are all busy or not.

When the outgoing connection operations are started, the marker activates the translator connector and the connector relay N (not shown) operates, the relay A0 is energized through a closed circuit consisting of the marker battery E2—resistor lamp RL0—contact $a0$ of the called subscriber's number relay A0 (not shown)—contact $n^2$ of the connector relay N—winding of called subscriber number receiving relay A0 of the translator—ground. Although this drawing shows only one called subscriber's number relay A0, there will be provided in an actual circuit a required number of the called subscriber's number relays. When the called subscriber's number relay in the translator operates, a contact tree corresponding to said number will be completed. Assuming that the called subscribers number corresponds to the terminal T0, the closed circuit consisting of the marker battery E2—resistor lamp RL1—contact $n^3$ of the connector relay—tree circuit—terminal T0 is completed.

As the terminal T0 in this example is arranged so that the first route will come to the route 0 and the second route will come to route 1 through the jumper conductors LR0 and LR01, the relay R0 is energized through a closed circuit consisting of the conductor LR0—terminal R0—make contact $rb0^1$—winding of relay R0—ground, if the route busy-condition indicating relay RB0 is operating to indicate that an idle trunk is available on the route 0. Operation of the relay R0 will cause the marker control relay DP and trunk block idle-condition indicating relay TBM0 to be activated through the closed loops consisting of the ground—contact $r0^1$—connector contact $n^1$—winding of the control relay DP of the marker—battery E2, and ground of the trunk busy-condition indicating relay—contact $b0^2$—conductor LTB0—route relay contact $r0^2$ of the translator—connector contact $n^0$ winding of the trunk idle-condition indicating relay TBM0 of each block—battery E2, respectively. Although only the relays DP, MF and TBM0 are shown as the control and trunk block idle-condition indicating relay, there will be, of course, in an actual circuit a required number of said control and trunk block idle-condition indicating relays will be provided.

The marker will then carry out the connecting operations, which have been previously described, based on this information. When all the trunks of the route 0 are busy and the route busy-condition indicating relay RB0 is not being energized, the system operates as follows. As previously described, the battery voltage developed across the terminal T0 and ground is applied to the route relay R1 corresponding to the route 1 through a closed loop consisting of the conductor LR0—terminal R0—break contact $rb0^1$ of relay RB—terminal T01—conductor LR01—terminal R1. The contact $rb1'$ of the route busy-condition indicating relay RB1 for the route 1 is also inserted herein and will operate if there is any idle trunk available. This causes the route relay R1 to operate and transfer the control information MF on the route 1 and idle-condition information TBM0 on the trunk block to the marker. When there is no idle trunk, they will be advanced to the third route through the break contact $rb1'$—terminal T12 if a jumper conductor LR12 is provided for said third route. If said jumper conductor is not available, no route relay will be able to operate, then the marker will detect the situation under which all the routes are busy.

When the battery voltage is developed on the terminal T1 as a result of translation of the called subscriber's number, the route 1 will come to the first route through a circuit of the conductor LR1—terminal R1. In this way, an automatic route advance without limitation in number of times of the route advance operations can be provided by means connecting the break side of a route busy-condition indicating relay contact *rb* of higher priority in the order of the route advancing with the make side of a route busy-condition indicating contact *rb* of lower priority.

The route advance operation at the time when the trunk fails to seize its idle channel will now be described. Assuming for simplicity of description that the trunk TRK0 is the only idle trunk of the route 0 and all other trunks are busy, only the trunk block idle-condition indicating relay TBM0 which is shown will operate when the translator is seized by the marker.

When the marker activates the trunk block connector TBC0 with a conventional circuit (not shown) to select the trunk TRK0, an operation check relay TBK (not shown) will operate to disconnect the holding circuit of the relay TBM0, thus releasing the relay TBM0. Upon release of the relay TBM0, the relay LTB for indicating the last trunk block will operate through a closed circuit consisting of the ground— contact $tbc^1$ of control relay TBC (not shown)—contact $tbm0^1$—contact of trunk block idle-condition indicating relay (not shown)—winding of relay LTB—battery E3.

On the other hand, the marker will select the trunk TRK0 through the trunk block connector TBC0 and upon release of the end-of-selection indicating relay TSE (not shown), the relay B0 will operate through a closed circuit consisting of marker ground—contact $tbc^3$—contact $tse^1$—connector contact $m^0$—conductor LB0 winding of relay B0 of the trunk—battery E0, thereby, the trunk TRK0 will be made busy.

When the relay B0 operates, the contact $b0^1$ thereof will cut out the ground connection for operating the route busy-condition supervising relay RB0. As previously assumed, all the other trunks are busy, therefore, the relay RB0 will be released. During this operation, the marker will continue the connecting operations and try to find an idle channel between the calling subscriber and the trunk with a known circuit (not shown) after carrying out the selection of said trunk. If the marker fails to obtain an idle channel, a recycling relay CHF (not shown) will operate.

The operation of relay CHF will complete a closed circuit consisting of the ground—contact $chf^1$—contact $ltb^1$—of the previously activated relay LTB—contact $tse^2$ of the previously released relay TSE—break contact $rav2^1$—break contact $rav1^1$—winding of the route advance relay RAV1—battery E3, thereby the route advance relay RAV1 will operate. The route advance relay RAV1 is self-held with a circuit containing its make contact $rav1^1$. The operation of this relay will cause the auxiliary relay RAV2 to operate through the contact $rav1^2$. The relay RAV2 will be self-held through a circuit containing its contact $rav2^2$. Also, upon operation of the relay RAV1, such relays as DP for receiving the control information fed from the translator will be released because their self-holding circuit will be opened by the break contact of the relay RAV1. The operation of the relay RAV2 and releasing of such control information relays as DP will cause the self-holding circuit of the relay RAV1 to be cut off, thus releasing said relay.

When the relay RAV2 operates and the relay RAV1 is released, the marker will return in the outgoing connection operations to its original condition of before its activating the translator connector and against activate said translator connector.

Upon operation of a translator connector seizing check relay TLK (not shown), the trunk block control relay TBC will be released because its self-holding circuit consisting of the ground—contact $tlk^1$—contact $ltb^2$—contact $tbc^2$ will be opened by the contact of the relay TLK. The release of the relay TBC will cause all the circuits related to the trunk block to be released. At the same time the operating circuit of the relay B0 of the trunk TRK0 is also opened, but it can continue operation until the alternate route information is given by the translator since it is a slow-release relay. The succeeding operations are repetitions of the aforementioned operations, therefore, no more description will now be necessary. Only difference between the previously described operations and the succeeding operations is that the operating conductor to the route relay R0 is switched to the route relay R1 through the contact $rb0^1$ in the latter case because the route busy-condition indicating relay RB0 in the translator has been released. This surely means that the next control information to be given will be related to the alternate route 1.

Although an embodiment of the outgoing connections according to the present invention has been described, it should be noted that the present invention will not be limited only thereto. It is apparent that the present invention will become very useful when the route advance function is incorporated in a proper portion of the switching equipment other than the marker, however, the effect of the present invention will not be decreased even if the route advance function is incorporated in the marker.

What is claimed is:

1. In an automatic telephone switching system of the common control type including a translator, a route advance system comprising supervising means for continuously supervising the busy/idle conditions of the trunks for each route, route advancing means for immediately avoiding a route upon the detection of an all-trunks-busy condition for this route and for advancing from the route to an alternative route, and trunk busying means for artificially busying a selected trunk when no idle channel is available through the switching equipment to this trunk and for advancing to an alternative route in such a case, said route advancing means and said trunk busying means being incorporated in said translator of the automatic telephone switching system.

2. In an automatic telephone switching system of the common control type including a translator and at least one marker for effecting connection of a calling subscriber through a switching network to one of a plurality of trunks forming routes to a called subscriber, a trunk selection system comprising supervising means for continuously supervising the busy/idle conditions of the trunks for each route, route selecting means for selecting a primary route to the called subscriber, route advancing means responsive to said supervising means for automatically advancing said route selecting means to an alternate route when said primary route contains no idle trunks, and trunk busying means for artificially busying a selected trunk when no path is available through the switching network to this trunk, said route advancing means being actuated in response to actuation of said trunk busying means, said route advancing means, route selecting means and trunk busying means forming part of the translator of the system.

3. The combination defined in claim 2, wherein said supervising means includes a plurality of trunk group supervising relays in said translator, each connected to one of a plurality of groups of trunks forming respective routes, and responsive to a busy condition simultaneously in all of the trunks in the group to which it is connected to actuate said route advancing means.

4. The combination defined in claim 3, wherein said route selecting means includes a called subscriber number tree responsive to a subscriber number indication from a marker for selecting a route formed by a group of trunks and means for transmitting the selected route designation to the marker.

5. The combination defined in claim 4, wherein said route advancing means includes a respective switch responsive to each trunk group supervising relay for connecting an output of said called subscriber number tree to a selected or an alternate route.

6. The combination defined in claim 3, wherein said trunk busying means includes relay means in the marker responsive to the condition where no free path is available to the selected trunk through the switching network for marking the selected trunk busy and effecting connection of the marker to said translator, whereby said translator automatically designates a trunk of another route.

7. The combination defined in claim 4, wherein each marker includes self holding means for holding the route designation received from said translator, said trunk busying means including relay means for busying a selected trunk to which a path through the switching network cannot be obtained and releasing said self holding means to permit receipt of a new route designation.

References Cited

UNITED STATES PATENTS

| | | |
|---|---|---|
| 3,155,775 | 11/1964 | Zarouni. |
| 3,342,945 | 9/1967 | Hopper et al. |
| 3,411,140 | 11/1968 | Halina et al. |
| 3,413,419 | 11/1968 | Klees et al. |

WILLIAM C. COOPER, Primary Examiner